United States Patent [19]

Mashimo

[11] 4,343,367

[45] * Aug. 10, 1982

[54] DRILLING MACHINE POSITIONING ARRANGEMENT

[75] Inventor: Toru Mashimo, Hiroshima, Japan

[73] Assignee: Toyo Kogyo Co., Ltd., Hiroshima, Japan

[*] Notice: The portion of the term of this patent subsequent to Dec. 23, 1997, has been disclaimed.

[21] Appl. No.: 208,119

[22] Filed: Nov. 18, 1980

Related U.S. Application Data

[63] Continuation of Ser. No. 914,748, Jun. 7, 1978, abandoned.

[30] Foreign Application Priority Data

Jun. 7, 1977 [JP] Japan .................................. 52-66996

[51] Int. Cl.³ ............................................. E21C 11/00
[52] U.S. Cl. .................................................... 173/43
[58] Field of Search ........................ 173/38, 42, 43, 44

[56] References Cited

U.S. PATENT DOCUMENTS

| | | | |
|---|---|---|---|
| 2,945,401 | 7/1960 | Howey et al. | 173/43 |
| 3,896,885 | 7/1975 | Dahlstrom et al. | 173/43 X |
| 3,980,142 | 9/1976 | Grigoriev et al. | 248/654 X |
| 4,240,511 | 12/1980 | Mashimo | 173/43 |

FOREIGN PATENT DOCUMENTS

54-29161 9/1979 Japan .

*Primary Examiner*—Wm. Carter Reynolds
*Attorney, Agent, or Firm*—Wenderoth, Lind & Ponack

[57] ABSTRACT

A positioning arrangement for a drilling machine or the like in which the desired position of a bit of the drilling machine mounted on a boom structure is indicated based on rectangular coordinates for facilitation of automatic positioning programming for the boom structure, with the position of a particular boom end being designated by numerical values for quick and accurate positioning of the boom structure at the required positions.

7 Claims, 15 Drawing Figures

DRILLING MACHINE POSITIONING ARRANGEMENT

This application is a continuation of application Ser. No. 914,748, filed June 7, 1978, now abandoned.

BACKGROUND OF THE INVENTION

The present invention relates to a positioning arrangement and more particularly, to a positioning arrangement for a boom or jib structure which supports, for example, a drilling machine such as a machine drill, i.e., rock drill, rock borer or the like.

Commonly drilling machines, for example, rock drills or rock borers are widely employed in mining, tunnel excavation, etc., for drilling rocks to form openings or holes in such rocks so as to enable placing therein of explosives and the like for blasting or for sampling rock cuttings to determine the mineral content of ore. Such a drilling machine is normally supported by an associated boom or jib structure which is mounted on a vehicle such as a truck or crawler so as to be operated, for example, by hydraulic rams for correct positioning of a bit of the drilling machine with respect to the rock or object to be drilled.

The conventional arrangement as described above, however, has a serious disadvantage in that, since the movement of the boom structure is based on particular spherical coordinates or spherical loci different from rectangular coordinates or rectangular loci well suited to human senses, it has been extremely difficult to designate proper positions of such a boom structure in an efficient manner. More specifically, in the conventional arrangement as described above, it is a general practice, for example, as disclosed in U.S. Pat. No. 3,980,142, to set up a servo or servo-mechanism by detecting displacement of the hydraulic cylinders for driving the boom structure, and since it is difficult to numerically designate the position of the boom end, i.e., the position of the bit of the drilling machine, there has been employed a system known as a reproduction control system (i.e., utilizing the so-called play back method) in which the positioning work is preliminarily effected by manual operation so as to be memorized for subsequent reproduction. The known play back method as described above, however, has drawbacks as follows.

(i) The designated values tend to be erroneous.
(ii) The programming depends solely on human skill.
(iii) Numerical designation can not be effected.
(iv) Since the programming is effected by the working maching, (i.e. drilling machine) itself, such working machine can not be operated during the programming, with consequent reduction in working efficiency.
(v) In a drilling machine having a complicated boom construction, for example, for smooth brushing boring, etc., considerable time is required for the programming work.

SUMMARY OF THE INVENTION

Accordingly, an essential object of the present invention is to provide a positioning arrangement for a boom structure for supporting a drilling machine and the like which is capable of automatically positioning a particular end of the boom structure at a desired position in an efficient manner.

Another important object of the present invention is to provide a positioning arrangement of the above described type in which, by indicating the desired position of the drilling machine bit mounted on the boom structure in terms of rectangular coordinates, the automatic positioning program for the boom structure is facilitated, with the position of the particular boom end being designated by numerical values in terms of rectangular coordinates for quick and accurate positioning of the boom structure in the desired positions.

A further object of the present invention is to provide a positioning arrangement of the above described type which is simple in construction and reliable in functioning, and can be readily incorporated into boom structures of various types at low cost.

In accomplishing these and other objects, according to the present invention, the positioning arrangement for a drilling machine and the like includes a boom structure on which the drilling machine is operably mounted, servo means for positioning the boom structure, memory means for storing working values for directly positioning the boom structure with respect to the rectangular coordinate plane, and converter means to bring the working values for said servo means for positioning said boom structure on said rectangular coordinate plane into conformity with the values stored in said memory means, said servo means for positioning the boom structure further being provided with a positioning servo control unit for positioning the boom structure according to values supplied from said converter means and feed back means which detects displacement of each boom driving hydraulic cylinder that is operated under the control of said positioning servo control unit for feeding back the displacement thus detected to said servo control unit.

By the arrangement as described above, not only is the automatic positioning programming of the boom structure facilitated by indication of the desired position of the drilling machine on the boom structure by the rectangular coordinate system, but the boom structure can be quickly and accurately positioned at the required position in an efficient manner by designating the position of the particular end of the boom structure with numerical values, with substantial elimination of disadvantages inherent in the conventional positioning arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Figure 1:
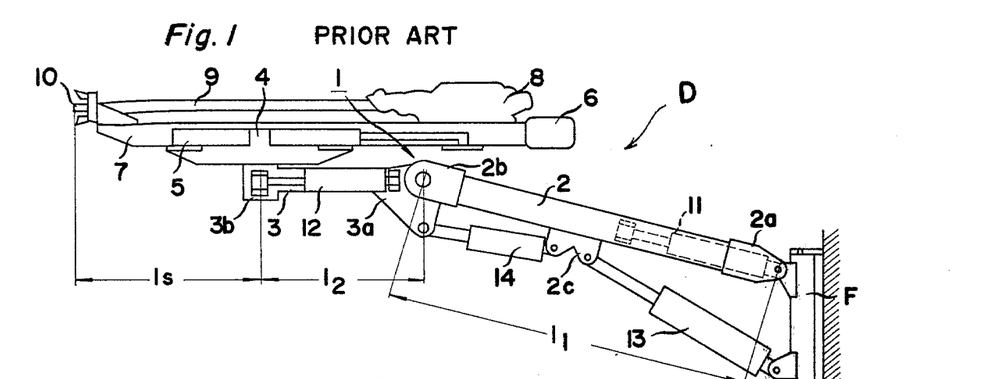
FIG. 1 is a side elevational view showing a conventional drilling machine mounted on a boom structure to which a positioning arrangement according to the present invention may be applied.
Figure 2:
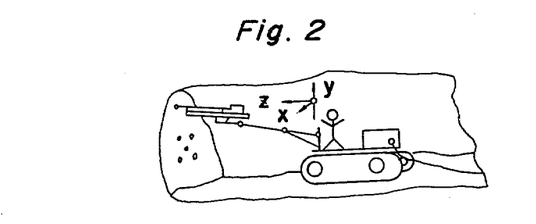
FIG. 2 is a diagram for explaining the operation of the drilling machine and boom structure of FIG. 1, FIGS. 3 and 4 are diagrams for explaining the displacement of the booms of the boom structure of FIG. 1.

Referring now to the drawings, there is shown in FIG. 1 one example of a conventional drilling machine and boom construction D to which the boom positioning arrangement according to the present invention may be applied. The drilling machine and boom construction D of FIG. 1 generally comprises a boom structure or boom means 1 including a first boom 2 pivotally connected at its one end 2a on a base F secured to a vehicle such as a truck or the like (not shown), a second boom 3 pivotally connected at its one end 3a to the other end 2b of the first boom 2, and a hydraulic cylinder 5 for a guide cell 7 secured to the other end 3b of said second boom 3 by a cell mounting 4. The guide cell 7 has a feed motor 6 attached at its rear end and is slidably mounted on the hydraulic cylinder 5 for reciprocation of said guide cell 7 by actuation of the hydraulic cylinder 5, and a drilling machine 8 having a bit 10 attached to one end of a rod 9 is reciprocatingly mounted on the guide cell 7 for advancing and retracting movement of said drilling machine 8 during a drilling operation. The boom means 1 on which the drilling machine 8 is mounted is arranged to be displaceable in swinging movement of said drilling machine 8 during a drilling operation. The boom means 1 on which the drilling machine 8 is mounted is arranged to be displaceable in swinging movement toward the left and right in a horizontal direction (direction x in FIG. 2) and also vertically (direction y in FIG. 2), and for the above purpose, a first hydraulic cylinder 11 for boom swing and a second hydraulic cylinder 12 for guide cell swing are respectively connected to the first boom 2 and second boom 3 for driving the latter in swinging movement in the horizontal direction, while a third hydraulic cylinder 13 for boom lift is pivotally connected at its one end to the base F and at its other end to a bracket 2c secured to an approximately central portion of the first boom 2, with a fourth hydraulic cylinder 14 for guide cell lift being connected at its one end to the bracket 2c and at its outer end to the end 3a of the second boom 3 for vertically driving the first and second booms 2 and 3 and the guide cell 7 as shown in FIG. 1.

Figure 3:
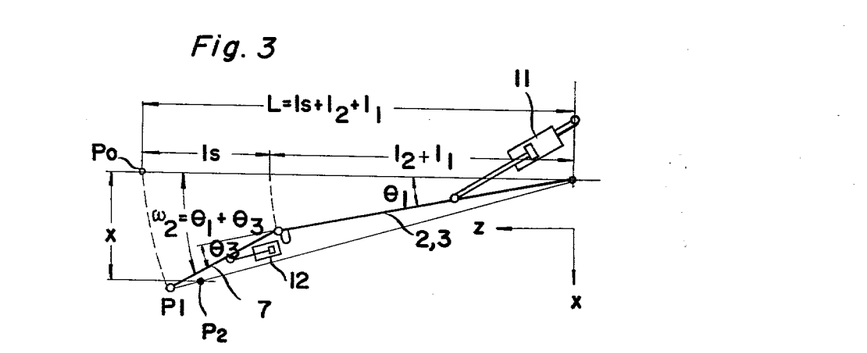
Figure 4:
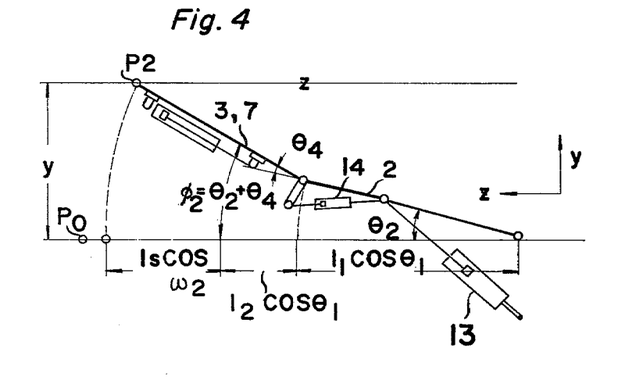

Referring particularly to FIGS. 3 and 4, the relation between the amount of movements of each of the hydraulic cylinders 11 to 14 and the distal end of the boom means 1 (i.e., the distal end of the guide cell 7) moving according to the movement of the hydraulic cylinders 11 to 14 will be analyzed hereinbelow. In FIG. 1, the length of the first boom 2 is represented by $l_1$, and that of the second boom 3 is represented by $l_2$, while the length from the forward end 3b of the second boom 3 to the forward end of the guide cell 7 (i.e., the amount of movement of the guide cell 7) is denoted by $l_s$. It is to be noted here, however, that the length $l_s$ denotes the distance to the distal end of the bit 10 when the bit 10 is projecting from the forward end of the guide cell 7.

A rectangular coordinate system $Q_A$ which has the x-z plane extending in the horizontal direction and the x-y plane extending in the vertical direction is thus established in front of the working face relative to the base on which the boom structure is mounted, and established when the boom means 1 is on the z axis, the distal end thereof is located at a point $P_0$ in FIGS. 3 and 4. Upon actuation of the first hydraulic cylinder 11 for the boom swing and second hydraulic cylinder 12 for the guide cell swing so as to move the first and second booms 2 and 3 through an angle $\theta_1$ and the guide cell 7 through an angle $\theta_3$ in the horizontal plane (i.e., plane x-z in FIG. 3) by the extension of the piston rod of the hydraulic cylinder 11 and retraction of the rod of the hydraulic cylinder 12, the distal end is shifted from the point $P_0$ as described above to a point $P_1$ in FIG. 3. Thereafter, when the first and second booms 2 and 3 and the guide cell 7 are respectively moved in the vertical plane (i.e., plane y-z in the drawing) through angles $\theta_2$ and $\theta_4$ by actuation of the third hydraulic cylinder 13 for the boom lift and the fourth hydraulic cylinder 14 for the guide cell lift, the distal end is shifted from the point $P_1$ to a point $P_2$. The position $X_2$, $Y_2$ and $Z_2$ of the point $P_2$ in the rectangular coordinate system $Q_A$ and direction $\omega_2$ and $\phi_2$ of the guide cell 7 are given by the following equation (1).

Position: (1)

$$x_2 = l_1\sin\theta_1 \cdot \cos\theta_2 + \{l_2\sin\theta_1 + l_s\sin(\theta_1 + \theta_3)\}\cos(\theta_2 + \theta_4)$$

$$y_2 = l_1\cos\theta_1 \cdot \sin\theta_2 + \{l_2\cos\theta_1 + l_s\cos(\theta_1 + \theta_3)\}\sin(\theta_2 + \theta_4)$$

$$z_2 = l_1\cos\theta_1 \cdot \cos\theta_2 + \{l_2\cos\theta_1 + l_s\cos(\theta_1 + \theta_3)\}\cos(\theta_2 + \theta_4)$$

Direction:

Horizontal direction $\omega_2 = \theta_1 + \theta_3$

Vertical direction $\phi_2 = \theta_2 + \theta_4$

In other words, the position of the point $P_2$ and the direction of the guide cell relative to the x-z and y-z planes are denoted by the equation (1) in the rectangular coordinate system $Q_A$ ($x_2$, $Y_2$, $z_2$, $\omega_2$, $\phi_2$) and also in the movable coordinate system $Q_B$ ($\theta_1,\theta_2,\theta_3,\theta_4,l_s$) of the boom means 1, which systems are interchangeable with each other. It is to be noted that, since length $l_1$ and $l_2$ are constant values, positions in the movable boom coordinate system $Q_B$ can be shown as parameters of $\theta_1$, $\theta_2$, $\theta_3$, $\theta_4$ and $l_s$.

$$\therefore Q_A (x_2,Y_2,z_2,\omega_2,\phi_2) \rightleftarrows Q_B (\theta_1,\theta_2,\theta_3,\theta_4,l_s)$$

Accordingly, controlling of the positions and directions of the guide cell at points $P_0$, $P_1$, $P_2$ ... and $P_n$ in the rectangular coordinate system can be achieved, if a coordinate converter $\{Q_A \rightarrow Q_B\}$ and a positioning servo control unit for the angles $\theta_1$, $\theta_2$, $\theta_3$ and $\theta_4$ and length $l_s$ are provided.

In the positioning arrangement according to the present invention, there are provided the coordinate converter [$Q_A \rightarrow Q_B$] and the positioning servo control unit as described above for positioning the boom means 1 in accordance with values indicating the position of the bit at the distal end of such boom means 1 in the rectangular coordinate system.

Figure 5:
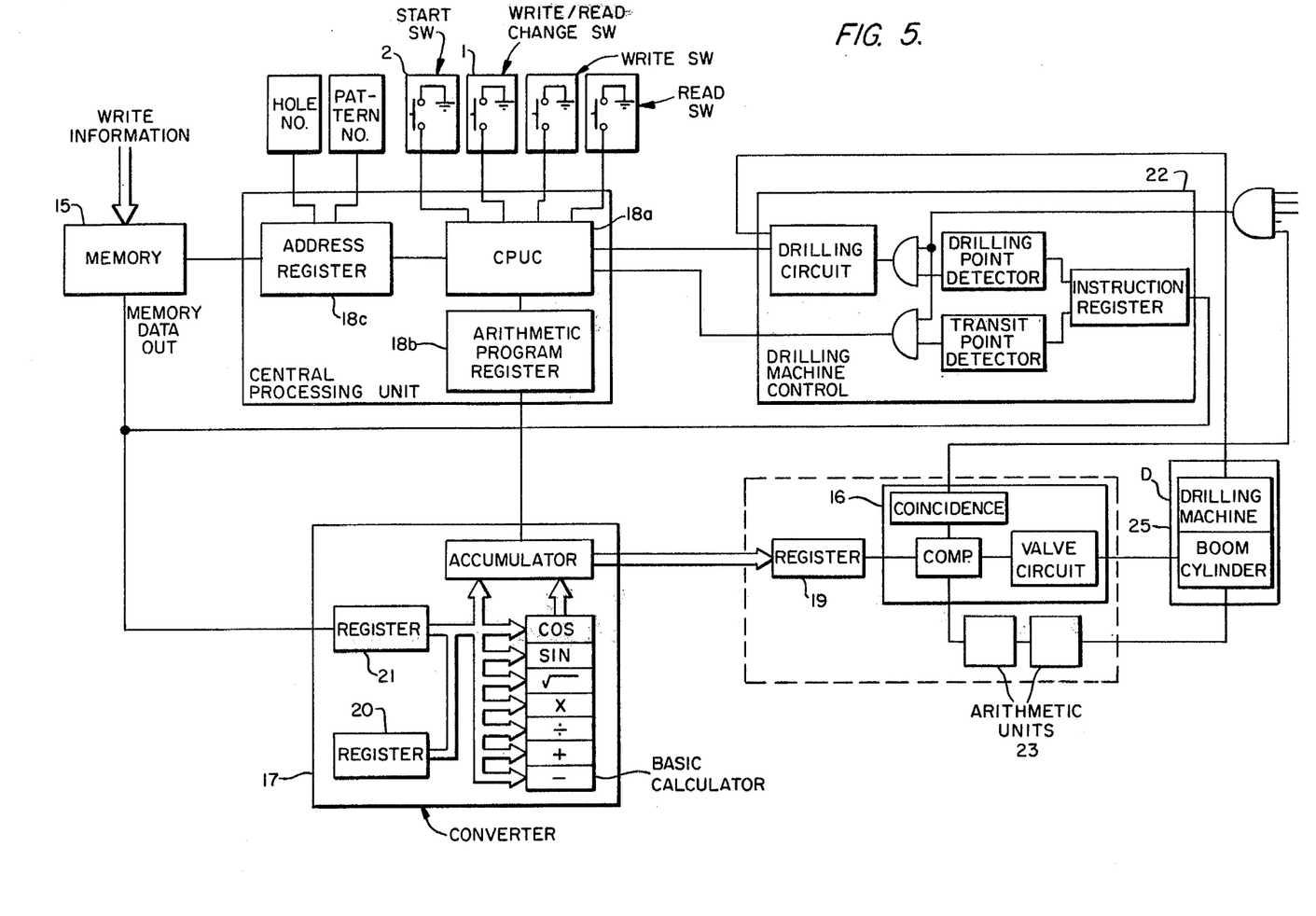
FIG. 5 is a block circuit diagram showing the construction of the boom positioning arrangement according to the present invention.

Referring particularly to the block diagram of FIG. 5, the boom positioning arrangement according to the present invention includes a central processing unit 18 to which operating input is applied and which is coupled to a memory means 15, to a [$Q_A \rightarrow Q_B$] converter 17, and the memory means 15 is also coupled to the converter 17, a register (II) 20 included in the converter 17, a register 19 connected between the converter 17 and a positioning servo control unit 16. The unit 16 is coupled to the drilling machine and boom structure D, two arithmetic units or detectors 23 connected between the positioning servo control unit and the drilling machine and boom structure D, and a drilling control unit 22 connected between the central processing unit 18 and the drilling machine and boom structure D and the positioning servo control unit 16 are coupled to the drilling machine control unit 22.

The memory means 15 is provided to store the coordinate values of distance and direction from a reference point to a drilling point in a drilling pattern plane for directly positioning the distal end of the boom means 1 in a rectangular coordinate plane established immediately in front of a working face according to a desired drilling pattern and can have the values of the amounts of movement of the first and second booms 2 and 3 set therein as desired, for example by right information means such as dial means (not shown). etc. . . . The positioning servo control unit 16 controls the amounts of movement of the pistons of the boom driving hydraulic cylinders 11 to 14 and the hydraulic cylinder 5 for the guide cell according to the angle of displacement of the first and second booms 2 and 3 of the boom means 1, while the [$Q_A \rightarrow Q_B$] converter 17 connected between the memory means 15 and the servo control unit 16 functions to convert the coordinate values for the position and direction ($x_n$, $y_n$, $z_n$, $\omega_n$ and $\phi_n$) of the boom distal end $P_n$ ($Q_A$), for example at the point $P_2$ in the rectangular coordinate system $Q_A$, into the coordinate system $Q_B$ (i.e., displacement angles $\theta_1$, $\theta_2$, $\theta_3$ and $\theta_4$ of each of the booms 2 and 3 and amount of displacement $l_s$ of the guide cell 7) for the boom means 1. The central processing unit 18 coupled to the memory means 15 and the converter 16 is for deriving values for the desired drilling position $P_n$ ($Q_A$) from the memory means 15 and supplying such values to the converter 17. The central processing unit 18 has a central processing unit circuit 18a from which outputs are connected to an arithmetic program register 18b and an address register 18c, and which receives an input signal from the drilling machine control unit 22. The circuit 18a is controlled by a start switch, a write/read change switch, a write switch and a read switch connected thereto. The address register 18c has a hole number means and a pattern number means connected thereto to supply this operation input to the central processing unit 18.

The converter 17 is a conventional arrangement including a register 21, a basic calculator and an accumulator, and is controlled by the arithmetic program register 18b to convert the boom position information from memory 15 from the coordinate system $Q_A$ to coordinate system $Q_B$ and supply it to the appropriate register 19.

In operation, the hole number and the pattern number are supplied to the address register 18c, the write/read change switch is switched over to the write mode, the start switch and the write switch are turned on to control the supply of address information to the memory 15, and the hole and pattern number information is supplied to the memory. Subsequently, the write/read change switch is switched over to a read mode, and the read switch is turned on, causing the stored data to be outputted from the memory 15.

Then the arithmetic program stored in the arithmetic program register 18b is transferred to the accumulator in the converter. Signals from the memory are stored in the register 21, which are then transferred to the accumulator and a principal arithmetic unit, the calculated values being transferred to the accumulator. On the other hand, the register (I) 19 connected between the converter 17 and the boom positioning servo control unit 16 is arranged to store the values for Pn ($Q_B$) produced by the converter 17 for transfer thereof to the servo control unit 16. The register (II) 20 coupled in the converter 17 functions to supply constants such as lengths $l_1$, $l_2$, etc. of the first boom 2 and second boom 3 of the converter 17. It should be noted here that the hydraulic cylinders 5 and 11 to 14 for driving the guide cell 7 and the boom means 1 including the first and second booms 2 and 3 are coupled to the positioning servo control unit 16 so as to be actuated according to the values of the working distance and direction supplied from the servo control unit 16.

The unit 16 has a comparator therein for receiving the information from the corresponding register 19, a valve circuit controlled by the output of the comparator which supplies the control signal to the boom cylinder, and a coincidence circuit connected to the comparator. The comparator further receives information on the boom position from arithmetic units 23, and the output is controlled by the difference between the input signals. When coincidence of signals is detected by the coincidence circuit, an output is directed to the drilling machine control unit 22. The drilling machine control unit 22 provides the control necessary for the drilling operation of the drilling machine 8 mounted on the guide cell 7 of the boom means 1, and receives signals from the positioning servo control unit 16 for causing the boom means 1 to start operation upon receipt of the signal indicating that the boom means 1 has been set at a desired position. The control unit 22 is also coupled to the positioning servo control unit 16 and the control processing unit 18 to provide a termination signal for each of the drilling operations to said positioning servo control unit 16 and the circuit 18a in the central processing unit 18. The drilling machine control unit 22 includes an instruction register for receiving input from the memory 15, a drilling point detector and a transit point detector, AND gates connected to the outputs of these detectors and to the signals from the unit 16 and a drilling circuit connected to the output of the AND gate for the drilling point detector which is in turn connected to the drilling machine, and the outputs from the AND gate for the transit point detector and the drilling circuit being connected to the central processing unit 18.

In operation, when the boom being moved under the control of unit 16 arrives at the desired position, the coincidence circuit supplies an output to the AND gates in the drilling machine control unit 22. The drilling instructions being supplied through the register are then supplied through the AND gates to the drilling circuit to carry out the drilling and upon completion a signal is transmitted to the central processing unit 18 to start the next program for positioning the drill and drilling the next hole.

It is to be noted here that for the parts of the drilling machine control unit 22 and the positioning servo control unit 16 as described above, conventional devices, for example, those disclosed in Japanese Laid Open Utility Model Application Jitsukaisho 50/121001, now Japanese Pat. No. 1,293,403, and Japanese Laid Open Patent Application Tokkaisho 50/121101, now Japanese Pat. No. 993,283, may be employed, while for the memory means 15, the parts of the converter 17 and the central processing unit 18 as described above, known devices may be used as they are or with improvements thereof.

It should also be noted here that since specific constructions of the units and devices described above are not directly related to the present invention and the present invention can be readily understood by those skilled in the art without a detailed description of such known units and devices, a detailed description thereof is omitted here for brevity.

Still referring to FIG. 5, the two arithmetic units or detectors 23 operate to work out the angles of displacement of the boom means 1 upon receipt of detection signals indicating the displacements of the hydraulic cylinders 11 to 14 for driving the first and second booms 2 and 3, and of the hydraulic cylinder 5 for the guide cell 7, and are coupled to the positioning servo control unit 16 so as to calculate and feed back the angles of displacement ($\theta_1$, $\theta_2$, $\theta_3$ and $\theta_4$) and the amount of displacement or amount of movement $l_s$ of the guide cell 7 for positioning of said boom means 1.

Figure 6:
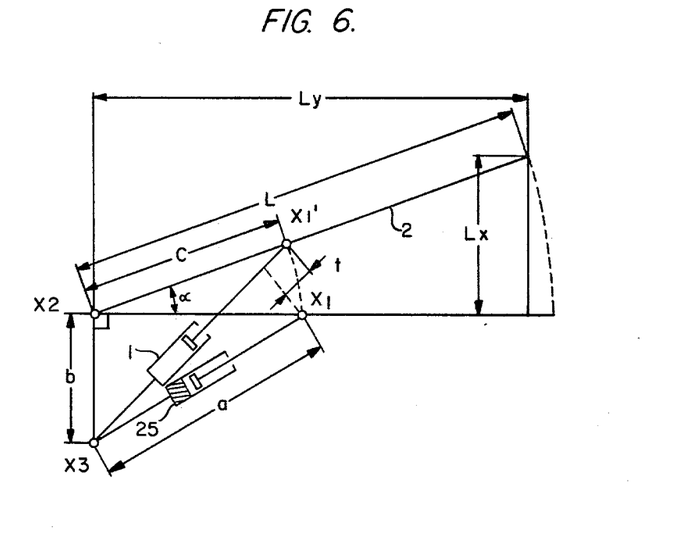
FIG. 6 is a schematic diagram showing the relation between angles of displacement of the booms and amounts of displacement of hydraulic cylinders for driving the booms.

Referring particularly to FIG. 6 showing the first boom 2 in a simplified form, the principle for detecting the angles of displacement $\theta_1$ to $\theta_4$ directly from the displacements of the driving hydraulic cylinders 11 to 14 without the arithmetic units 23 or indirectly through the arithmetic units 23 will be explained hereinbelow.

In FIG. 6, when the first boom 2 is in a horizontal state, a triangle $\Delta X_1 X_2 X_3$ can be defined which is right-angled. Accordingly, if the lengths of the respective sides thereof are represented by a, b and c, the following relation is established.

$$a^2 = b^2 + c^2 \ldots \quad (2)$$

If the point $X_1$ is shifted to a point $X'_1$, by moving boom 2 upward through an angle $\alpha$, distance along side a between the points $X_1$ and $X'_1$ is increased by t, and the following equation is established.

$$(a+t)^2 = (b + c \sin \alpha)^2 + (c \cos \alpha)^2 = b^2 + c^2 + 2bc \sin \alpha \ldots \quad (3)$$

From the equations (2) and (3), $$t^2 + 2at = 2bc \sin \alpha$$

$$\sin \alpha = \frac{t^2 + 2at}{2bc} \quad (4)$$

Therefore, the angle $\alpha$ may be represented by the following equation.

$$\alpha = \sin^{-1} \frac{t^2 + 2at}{2bc} \quad (5)$$

In the above equation (5), if (a)/(bc) is replaced by T,

$$\alpha = \sin^{-1} \left\{ \frac{bc}{2a^2} T^2 + T \right\}$$

and if $(bc)/(a^2)$ is further replaced by $K_1$, the equation (5) may be replaced as follows.

$$\alpha = \sin^{-1} \left( \frac{K_1}{2} T^2 + T \right) \quad (6)$$

As described above, the angle $\alpha$ of the boom is obtained by the displacement T of the hydraulic cylinder by the use of the equation (6).

More specifically, the result as described above is achieved by the employment of the two arithmetic units 23 connected as follows and carrying out the indicated calculation (in this case, employment of digital arithmetic units is advantageous).

Figure 7:
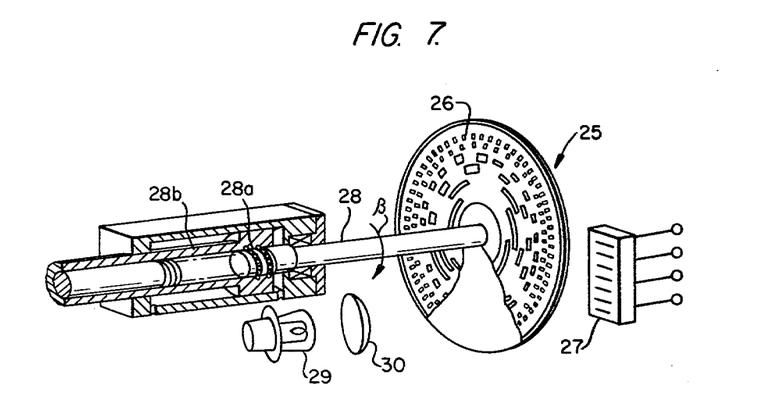
FIG. 7 is an exploded view of an encoder employed in the arrangement of FIG. 5, and FIGS. 8 to 15 are schematic diagrams for explaining the applications of the positioning arrangement of FIG. 5 to other boom structures.
Figure 8:
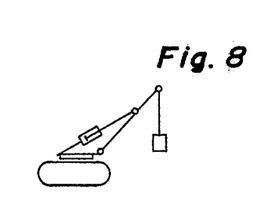
Figure 9:
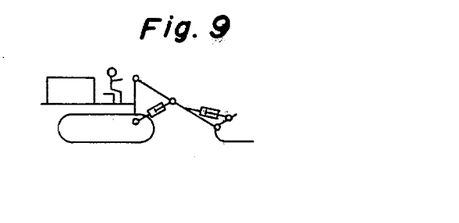
Figure 10:
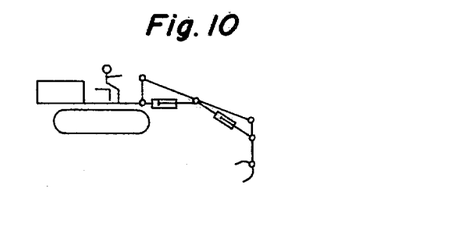
Figure 11:
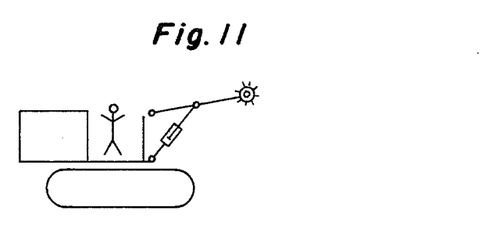
Figure 12:
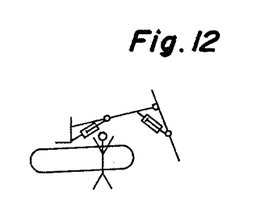
Figure 13:
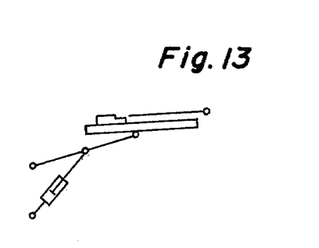
Figure 14:
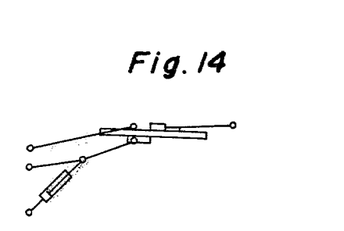
Figure 15:
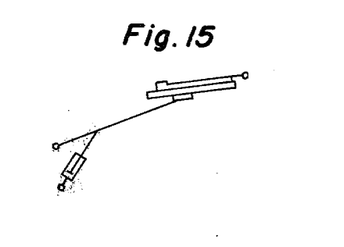

For detection of the value T, an encoder 25 as schematically shown in FIG. 7 may be incorporated in each of the driving hydraulic cylinders. The encoder 25 is mounted on the axis of each of the driving hydraulic cylinders 11 to 14 at the inner end of the cylinder and includes an apertured rotary disc 26 fixed to a shaft 28 extending into a hollow piston shaft 28b in the hydraulic cylinder and a detector 27 accommodated in a casing (not shown) secured to the particular hydraulic cylinder. The rotary disc 26 is rotated by the shaft 28 which in turn is rotated as the piston 28b moves as hydraulic medium is introduced into the hydraulic cylinder by the spiral groove and ball means 28a forming the connection between the shaft 28 and piston 28b. The disc 26 comprises means to produce a 1, 0 pattern as a physical representation of the amount of flow of hydraulic fluid for detection by the detector 27. The encoder 25 employs light as the medium for physical representation and further includes a light source in the form of a lamp 29 and a condenser lens 30 to apply light onto the surface of the rotary disc 26 so that the light which passes through the apertures is detected by the detector 27 in the form of, for example, a photo transistor (not shown).

The relation between angle $\beta$ through which the rotary disc 26 rotates and the output signal T is represented by the following equation.

$$T = K_2 \beta \ldots \quad (7)$$

where $K_2$ is a constant. However, if the pattern of apertures in the disc of the encoder is used as a function generator satisfying the equation (6) instead of the above equation (7), the angle $\alpha$ can be directly obtained from the encoder 25.

For obtaining such pattern of the apertures to operate as a function generator (encoder) satisfying the equation (6), the equation (7) is substituted into the equation (6).

$$\alpha = \sin^{-1}\left(\frac{K_1 K_2^2}{2}\beta^2 + K_2\beta\right)$$

Solving the above equation for $\beta$, the following relation is obtained.

$$\beta = \frac{-1 + \sqrt{1 + 2K_1 \cdot \sin\alpha}}{K_1 K_2} \quad (8)$$

wherein
(1) $\beta > 0$
(2) $1 + 2K_1 \sin\alpha > 0$

Thus, the relation of the pattern angle $\beta$ of the encoder with respect to the angle $\alpha$ of each arm of the boom means 1 is obtained.

Accordingly, by obtaining the pattern angle $\beta$ by utilization of the encoder 25 as a particular function generator, the distances $L_x$ and $L_y$ in FIG. 6 can consequently be detected.

Using the above described arrangement, the coordinate values of the position and direction of the drill at points in the drilling pattern of the drilling machine 8 in the predetermined rectangular coordinate system are first stored in the memory means 15. Subsequently, when the operation input is applied to the central processing unit 18, the information for the values for the desired drilling point $P_n(X_n, Y_n, Z_n, \omega_n, \phi_n)$ in the rectangular coordinate system are caused to enter the converter 17 for conversionn from the system $Q_A$ to the boom coordinate system $Q_B$ and the position in the boom coordinates are stored in the register (1) 19, and according to the instruction therefrom, the driving hydraulic cylinders 5 and 11 to 14 are respectively actuated to extend the piston rods thereof by the boom positioning servo control unit 16 for bringing the distal end of the boom means 1 to the desired position. In this case, the detection of the angles of the boom means are simultaneously effected based on the displacements of the pistons of the respective hydraulic cylinders for feeding back to the servo control device 16. Upon completion of the positioning as described above, the drilling machine 8 carries out the drilling operation under the control of the drilling machine control unit 22. When the drilling operation is completed, a termination signal is supplied to the central processing unit 18, which then obtains values for a new position from the memory means 15 to be applied to the converter 17. The positioning of the boom means 1 and drilling operation are carried out in the order as described above, and with the procedure being sequentially repeated, and the drilling operation is terminated after completion of a particular pattern.

It should be noted here that in the foregong embodiment, although the present invention is mainly described with reference to the boom positioning arrangement for a drilling machine, the concept of the positioning arrangement according to the present invention is not limited in its application to such a drilling machine boom structure alone, but is readily applicable to various other mounting arrangements having boom structure as described hereinbelow.

In each of the boom structures schematically shown in FIGS. 8 through 15, the construction and function are similar to the positioning arrangement described with reference to the foregoing embodiment, if various conditions as stated hereinbelow are introduced into the earlier mentioned equation (1). Such conditions are $l_s = l_2 = 0$, $\theta_1 = \theta_3 = 0$ for the crane shown in FIG. 8, $l_s = 0$, $\theta_1 = \theta_3 = 0$ for the bulldozer shown in FIG. 9, $\theta_1 = \theta_3 = 0$ for the back hoe shown in FIG. 10, $\theta_3 = \theta_4 = 0$, $l_2 = l_s = 0$ for the rock scraper of FIG. 11, $l_2 = 0$, $\theta_4 = 0$ for the crawler drill of FIG. 12, $\theta_2 = 0$ for the $J_s$ boom of FIG. 13, $l_2 = 0$, $\theta_2 + \theta_4 = \theta_0 =$ constant, $\theta_1 + \theta_3 =$ constant for the SB boom of FIG. 14, and $l_2 = 0$, $l_1 =$ variable for the extension boom of FIG. 15, and these conditions should be supplied to the register (II) 20.

It should be noted that the encoder 25 described as mounted on the axis of each of the hydraulic cylinders in the foregoing embodiment may be modified so as to be disposed in a position offset from such axis and be actuated by a gear or screw mechanism.

As is clear from the foregoing description, in the boom positioning arrangement according to the present invention, by positioning the boom structure in the rectangular coordinate system it becomes possible to readily provide position instruction information, while movement to the desired position is positively achieved without instruction errors, since the instruction can be given by the numerical values in the rectangular coordinate system. Moreover, a converter is provided for converting the positional information from the rectangular coordinate system to the boom coordinate system. In addition, due to the fact that the working machine itself is not directly used for programming, efficient operation of such working machine is achieved. Furthermore, since the angles of the boom structure are detected from the displacements of the boom by hydraulic cylinders without installation of separate special angle detectors, etc., with the detected values of the angular displacement of the boom structure being fed back to the boom positioning servo control unit, the boom structure can be positioned quickly and correctly in an efficient manner.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

I claim:

1. A positioning arrangement for a drilling machine and the like which comprises, boom means on which the drilling machine is operably mounted;

memory means for storing coordinate values of the working distance and working direction from a reference point to a drilling point on a drilling pattern plane immediately in front of a working face to be drilled, said working distance and working direction being in a rectangular coordinate system, and including means for supplying said values as output from said memory means;

converter means connected to said memory means for converting said working distance and working direction values from the rectangular coordinate system to a boom coordinate system, and for providing said converter values as output;

positioning servo control means connected to said converter means and to said boom means for displacing said boom means according to said working distance and working direction values supplied as output from said converter means for bringing the drilling machine into adjustment with the drilling point in the drilling pattern plane; and arithmetic means connected to said boom means and to said positioning servo control means for calculating values of the working distance and working direction upon displacement of the boom means and for feeding back said calculated values to said position servo control means.

2. A positioning arrangement as claimed in claim 1, further including a central processing unit coupled to said memory means and said converter means for instructing said memory means to supply values therefrom and instructing said converter means to supply converted values therefrom in the proper sequence to said positioning servo control means.

3. A position arrangement as claimed in claim 1, further including drilling machine control means connected to said drilling machine and said positioning servo control means for controlling the drilling operation of said drilling machine after it has been moved to the actual drilling point.

4. A positioning arrangement as claimed in claim 1, wherein said boom means includes hydraulic cylinder means to which said positioning servo control means is connected for displacing said boom means and drilling machine.

5. A positioning arrangement as claimed in claim 1, wherein said arithmetic means is provided with encoder means connected with said boom means for receiving an output corresponding to said values of the working distance and working direction and for producing an output corresponding to the amount of movement of said boom means.

6. A positioning arrangement as claimed in claim 1, further comprising a first register connected between said converter means and said positioning servo control means for storing the values of the working distance and the working direction for the drilling point supplied from said converter means for transfer of said values to said positioning servo control means; and a second register connected to said converter means for storing and feeding constant values for said boom means to said converter means.

7. A method for positioning a drilling machine and the like by moving a boom means on which the drilling machine is operably mounted, said positioning method comprising the steps of, memorizing coordinate values of the working distance and working direction from a reference point to a drilling point on a drilling pattern plane immediately in front of a working face to be drilled, said working distance and working direction being in a rectangular coordinate system;

converting said working distance and working direction values from the rectangular coordinate system to the boom coordinate system;

displacing said boom means according to said working distance and working direction values to bring the drilling machine into adjustment with the drilling point of the drilling pattern plane; and feeding back the working distance and working direction values calculated from the displacement of the boom means to control said displacing of said boom means.

* * * * *